US008074158B2

(12) United States Patent
Visvanathan et al.

(10) Patent No.: US 8,074,158 B2
(45) Date of Patent: *Dec. 6, 2011

(54) ERASURE DETECTION FOR A TRANSPORT CHANNEL WITH AN UNKNOWN FORMAT

(75) Inventors: Arun Visvanathan, Urbana, IL (US);
Amit Butala, Santa Clara, CA (US);
Parvathanathan Subrahmanya, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 940 days.

This patent is subject to a terminal disclaimer.

(21) Appl. No.: 11/049,991

(22) Filed: Feb. 2, 2005

(65) Prior Publication Data
US 2006/0174179 A1 Aug. 3, 2006

(51) Int. Cl.
*G06F 11/00* (2006.01)

(52) U.S. Cl. ....................................................... 714/799

(58) Field of Classification Search .................. 714/799
See application file for complete search history.

(56) References Cited

U.S. PATENT DOCUMENTS

| 5,751,725 | A | 5/1998 | Chen |
| 6,029,268 | A | 2/2000 | Kong et al. |
| 6,175,590 | B1 * | 1/2001 | Stein ............................ 375/225 |
| 6,208,699 | B1 * | 3/2001 | Chen et al. ................... 375/340 |
| 6,501,982 | B1 | 12/2002 | Ruchti et al. |
| 6,560,744 | B1 | 5/2003 | Burshtein |
| 6,633,552 | B1 | 10/2003 | Ling et al. |
| 6,847,731 | B1 | 1/2005 | Caulfield |
| 6,975,868 | B2 * | 12/2005 | Joshi et al. ................. 455/452.1 |
| 7,143,178 | B2 * | 11/2006 | Glazko et al. ................. 709/231 |
| 7,159,164 | B1 * | 1/2007 | Saifuddin et al. ............. 714/755 |

(Continued)

FOREIGN PATENT DOCUMENTS

EP     1478103 A2    11/2004

(Continued)

OTHER PUBLICATIONS

Xiaoming Liu, et al: "Shot Boundary Detection Using Temporal Statistics Modeling". 2002 IEEE International Conference on Acoustics, Speech, and Signal Processing Proceedings. (ICASSP). Orlando, FL, May 13-17, 2002, IEEE International Conference on Acoustics, Speech, and Signal Processing (ICASSP), New York, NY: IEEE, US, vol. 4 of 4, May 13, 2002, pp. 3389-3390.

(Continued)

*Primary Examiner* — Scott T Baderman
*Assistant Examiner* — Enam Ahmed
(74) *Attorney, Agent, or Firm* — Kevin T. Cheatham

(57) ABSTRACT

To perform erasure detection for an intermittently active transport channel with unknown format, a receiver determines an energy metric and a symbol error rate (SER) for a received block with CRC failure. The receiver computes uncorrelated random variables u and v for the received block based on the energy metric and SER, the estimated means and standard deviations of the energy metric and SER, and a correlation coefficient indicative of the correlation between the energy metric and SER. The receiver then evaluates the uncorrelated random variables u and v based on at least one decision criterion and declares the received block to be an erased block or a DTX block based on the result of the evaluation. The decision criterion may be defined based on a target probability of false alarm and adjusted based on another metric, such as a zero state bit, for the received block.

29 Claims, 10 Drawing Sheets

U.S. PATENT DOCUMENTS

| | | |
|---|---|---|
| 7,181,170 B2 | 2/2007 | Love et al. |
| 7,197,692 B2 | 3/2007 | Sutivong et al. |
| 7,505,534 B1 * | 3/2009 | Xue et al. .................... 375/340 |
| 2002/0028021 A1 | 3/2002 | Foote et al. |
| 2003/0014728 A1 | 1/2003 | Shaeffer et al. |
| 2003/0142728 A1 | 7/2003 | Lin |
| 2004/0095918 A1 | 5/2004 | Dominique et al. |
| 2004/0203463 A1 * | 10/2004 | Chen et al. ................ 455/67.13 |
| 2005/0123059 A1 | 6/2005 | Harris et al. |

FOREIGN PATENT DOCUMENTS

| | | |
|---|---|---|
| JP | 2006509449 | 3/2006 |
| KR | 1020030010661 | 2/2003 |
| WO | WO0195501 | 12/2001 |
| WO | 03005279 A1 | 1/2003 |
| WO | WO03065613 | 8/2003 |
| WO | WO2004006599 A1 | 1/2004 |
| WO | WO2004054311 | 6/2004 |
| WO | WO2005006605 | 1/2005 |

OTHER PUBLICATIONS

Aldajani M A, et al: "A Stable Adaptive Structure for Delta Modulation With Improved Performance". 2001 IEEE International Conference on Acoustics, Speech, and Signal Processing Proceedings. (ICASSP). Salt Lake City, UT, May 7-11, 2001, IEEE International Conference on Acoustics, Speech, and Signal Processing (ICASSP), New York, NY: IEEE, US, vol. 1 of 6, May 7, 2001, pp. 2621-2624.
International Search Report and Written Opinion—PCT/US2006/004129, International Search Authority—European Patent Office—Aug. 24, 2006.

* cited by examiner

ERASURE DETECTION FOR A TRANSPORT CHANNEL WITH AN UNKNOWN FORMAT

BACKGROUND

I. Field

The present invention relates generally to communication, and more specifically to techniques for performing erasure detection in a wireless communication system.

II. Background

In a wireless communication system, a wireless device (e.g., a cellular phone) communicates with one or more base stations via transmissions on the downlink and uplink. The downlink (or forward link) refers to the communication link from the base stations to the wireless devices, and the uplink (or reverse link) refers to the communication link from the wireless devices to the base stations. In a Code Division Multiple Access (CDMA) system, a base station can transmit data to multiple wireless devices simultaneously. The total transmit power available at the base station determines the downlink capacity of the base station. A portion of the total transmit power is allocated to each active wireless device such that the aggregate transmit power used for all active wireless devices is less than or equal to the total transmit power.

To maximize downlink capacity, a power control mechanism is typically used for each wireless device. The power control mechanism is normally implemented with two power control loops, which are often called an "inner" loop and an "outer" loop. The inner loop adjusts the transmit power used for data transmission to the wireless device such that the received signal quality, which may be quantified by a signal-to-noise-plus-interference ratio (SIR), is maintained at an SIR target. The outer loop adjusts the SIR target to achieve a desired level of performance, which may be quantified by a block error rate (BLER) target and/or some other performance criterion.

The outer loop adjusts the SIR target based on the status of data blocks received by the wireless device. The outer loop typically decreases the SIR target by a small DOWN step if a "good" data block is received and increases the SIR target by a large UP step if a "bad" data block is received. The DOWN and UP steps are selected based on the BLER target and possibly other factors. This SIR target adjustment assumes that the status of each received data block can be reliably determined. This can normally be achieved by generating and appending a cyclic redundancy check (CRC) value to each data block prior to transmission. The wireless device can then check each received data block based on its CRC value to determine whether the data block was decoded correctly (good) or in error (bad).

A CDMA system may support data transmission using multiple transport channels and/or with multiple formats. One transport channel may carry data blocks continually and may use formats that require a CRC value to be appended to each data block sent on that transport channel. Another transport channel may be operated in a non-continuous manner so that data blocks are not transmitted some or most of the time on that transport channel. This non-continuous transmission is commonly called discontinuous transmission (DTX). No data blocks are transmitted on the transport channel during periods of no transmission, and the non-transmitted blocks are called DTX blocks. Power control for a data transmission on an intermittently active transport channel is challenging. This is because it may be difficult to accurately ascertain the true status of each received block on such a transport channel—whether the received block is a good block, a DTX block, or a bad block.

There is therefore a need in the art for techniques to reliably determine the status of each received block for an intermittently active transport channel.

SUMMARY

Techniques for performing erasure detection for an intermittently active transport channel with unknown format are described herein. Because the transport channel is intermittently active, a data block may or may not be sent on the transport channel in each transmission time interval (TTI). Because the format for the transport channel is unknown, a receiver does not know whether a received block is for a transmitted block or a non-transmitted block. For such a transport channel, the receiver can first determine whether the received block is a good block based on the CRC. If the received block fails the CRC, then the receiver can perform erasure detection to determine whether the received block is an erased block or a DTX block.

In a specific embodiment for performing erasure detection, the receiver determines an energy metric and a symbol error rate (SER) for a received block with CRC failure. The receiver computes uncorrelated random variables u and v for the received block based on the energy metric and SER, the estimated means and standard deviations of the energy metric and SER, and a correlation coefficient indicative of the correlation between the energy metric and SER. The receiver then evaluates the uncorrelated random variables u and v based on at least one decision criterion and declares the received block to be an erased block or a DTX block based on the result of this evaluation. The at least one decision criterion may be defined based on a target probability of false alarm and further selected or adjusted based on one or more other metrics, such as a zero state bit, for the received block.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
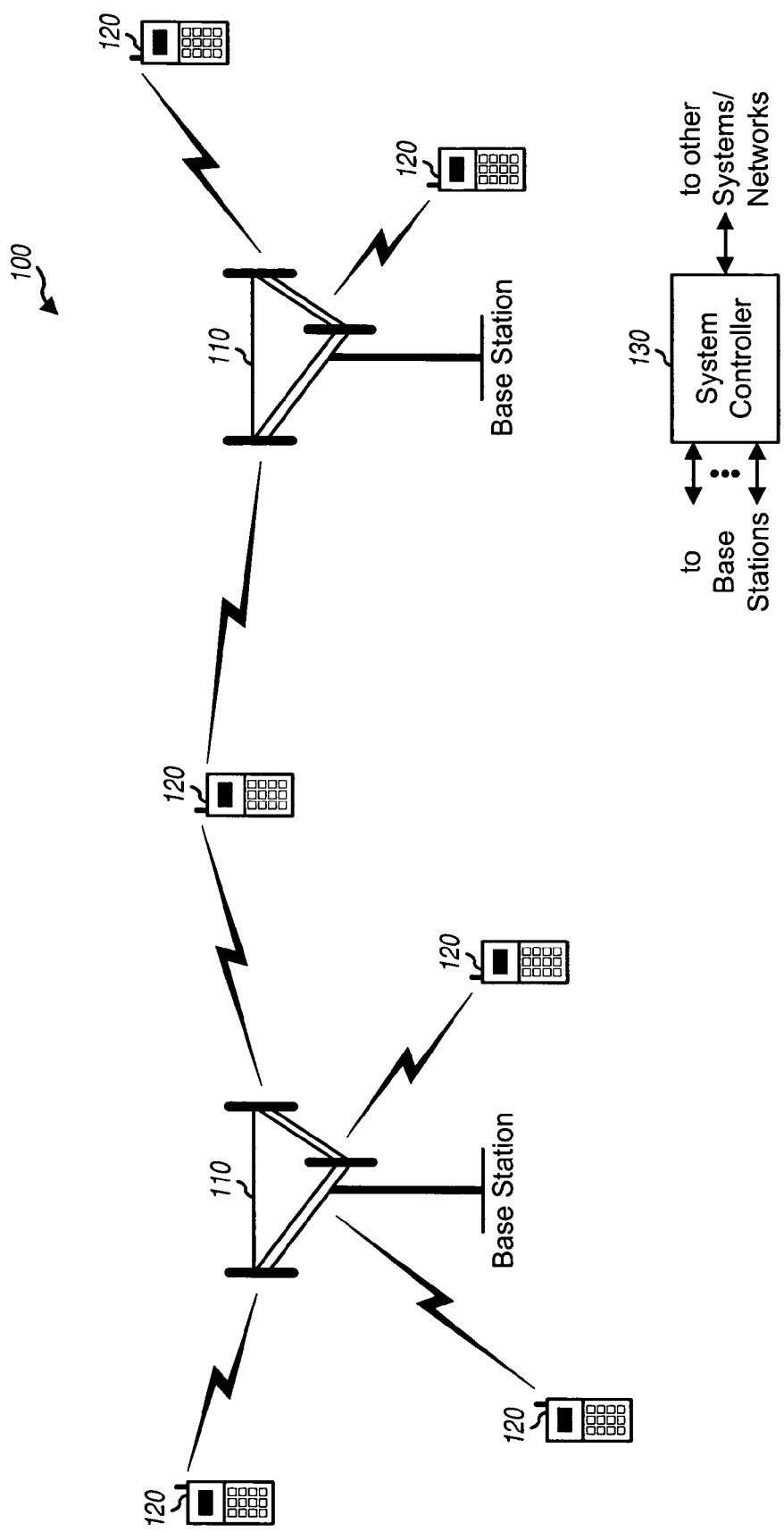
FIG. 1 shows a wireless communication system.

FIG. 1 shows a wireless communication system 100. System 100 includes a number of base stations 110 that provide communication coverage for a number of wireless devices 120. A base station is typically a fixed station that communicates with the wireless devices and may also be called a node B, a base transceiver system (BTS), an access point, or some other terminology. A wireless device may be fixed or mobile and may also be called a user equipment (UE), a mobile station, a user terminal, a handset, a subscriber unit, or some other terminology. A wireless device may communicate with one or multiple base stations on the downlink and/or one or multiple base stations on the uplink at any given moment. A system controller 130 couples to base stations 110 and provides coordination and control for these base stations. System controller 130 may also be called a radio network controller (RNC), a base station controller (BSC), or some other terminology.

The detection techniques described herein may be used for various communication systems such as a CDMA system, a Time Division Multiple Access (TDMA) system, a Frequency Division Multiple Access (FDMA) system, an Orthogonal Frequency Division Multiple Access (OFDMA) system, and so on. A CDMA system may implement one or more CDMA radio access technologies (RATs) such as cdma2000 and Wideband-CDMA (W-CDMA). cdma2000 covers IS-2000, IS-856, and IS-95 standards. A TDMA system may implement one or more TDMA RATs such as Global System for Mobile Communications (GSM). These various RATs and standards are well known in the art. The detection techniques may also be used for downlink transmission as well as uplink transmission. For clarity, these techniques are specifically described below for downlink transmission of a voice call in a W-CDMA system.

In W-CDMA, a base station transmits data and signaling to a wireless device using one or more logical channels at a Radio Link Control (RLC) layer. The logical channels commonly used for data transmission include a dedicated traffic channel (DTCH) and a dedicated control channel (DCCH). The logical channels are mapped to transport channels at a Medium Access Control (MAC) layer. The transport channels may carry data for one or more services (e.g., voice, video, packet data, and so on), and each transport channel may be encoded separately. The transport channels are further mapped to physical channels at a physical layer. The channel structure for W-CDMA is described in a document 3GPP TS 25.211, which is publicly available.

Each transport channel is associated with (1) a TTI that may span one, two, four, or eight 10-millisecond (ms) frames and (2) a transport format set containing one or more transport formats usable for that transport channel. Each transport format specifies various processing parameters such as (1) the size of each block of data (or transport block), (2) the number of transport blocks for each TTI, (3) the length of each code block, (4) the coding scheme to use for the TTI, and so on. A BLER target may also be specified for each transport channel, which allows different transport channels to achieve different quality of service (QoS). Each transport channel may require a different SIR target, which is dependent on the BLER target and the transport format(s) for that transport channel.

Different sets of transport channels may be used for different types of call (e.g., voice, packet data, and so on) and for different calls of the same type. A voice call in W-CDMA is processed using an Adaptive Multi Rate (AMR) coding scheme, which encodes speech data into three classes of data bits often called Classes A, B, and C. These three classes have different levels of importance, are processed as three subflows for a DTCH at the RLC layer, and are sent on three transport channels at the MAC layer. Control data for the voice call is processed as a DCCH at the RLC layer.

Figure 2:
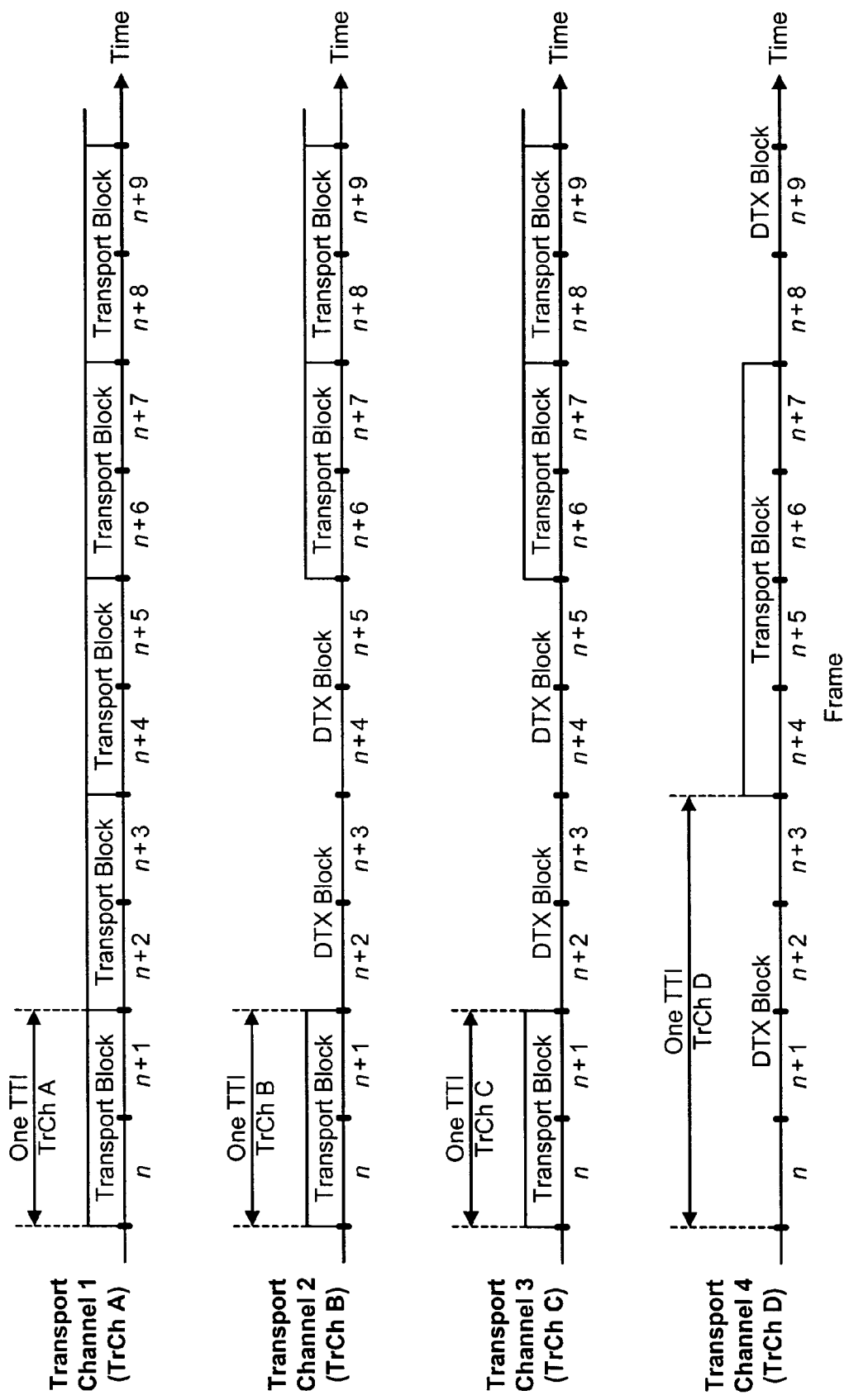
FIG. 2 shows transport channels used for a voice call in W-CDMA.

FIG. 2 shows the transport channels used for an exemplary voice call in W-CDMA, as described in 3GPP TS 34.108, Section 6.10.2.4. Transport channels 1 through 4 are four instances of a dedicated transport channel (DCH) at the MAC layer. Transport channels 1, 2 and 3 carry speech data for Classes A, B and C, respectively, and have TTIs of 20 ms. Transport channel 4 carries control data for the voice call and has a TTI of 40 ms. Transport channels 1, 2, 3 and 4 are also called TrChs A, B, C and D, respectively. TrCh A carries a transport block with CRC using one of three possible transport formats in each TTI regardless of whether there is voice activity. Each of TrChs B, C and D may carry a transport block or a DTX block in each TTI, depending on whether there is any data to send on the transport channel in the TTI. Transport blocks are sent without CRC on TrChs B and C and with CRC on TrCh D. All four transport channels are multiplexed and sent on a downlink dedicated physical channel (downlink DPCH).

Figure 3:
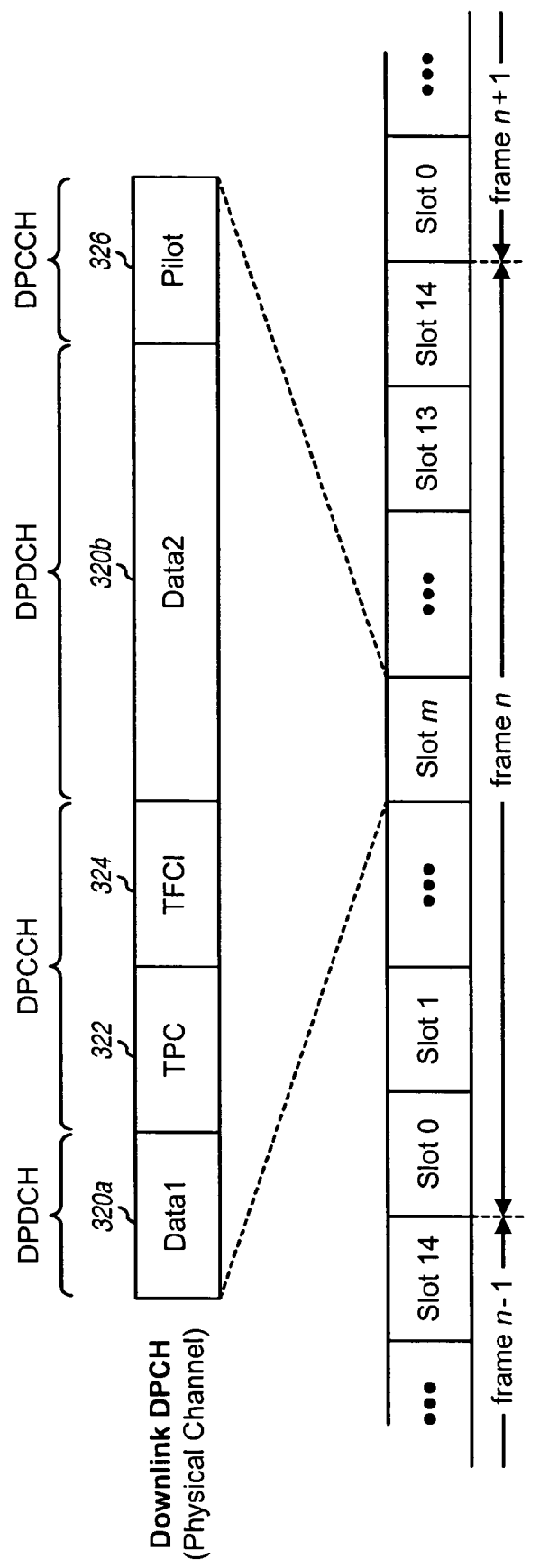
FIG. 3 shows the format of a downlink DPCH in W-CDMA.

FIG. 3 shows the format of the downlink DPCH in W-CDMA. The downlink DPCH is composed of a downlink dedicated physical data channel (DPDCH) and a downlink dedicated physical control channel (DPCCH), which are time division multiplexed. The DPDCH carries transport channel data (e.g., for TrChs A, B and C), and the DPCCH carries control data (e.g., for TrCh D). Data is sent on the downlink DPCH in 10 ms radio frames. Each radio frame is divided into 15 slots. Each slot is partitioned into two data fields 320a and 320b, a transmit power control (TPC) field 322, a transport format combination indicator (TFCI) field 324, and a pilot field 326. Data fields 320a and 320b carry the transport channel data. TPC field 322 carries a TPC command that directs the wireless device to adjust its uplink transmit power either up or down. TFCI field 324 carries transport format information for the downlink DPCH. Pilot field 326 carries a dedicated pilot for the wireless device. The duration of each field is determined by the slot format used for the downlink DPCH.

TFCI field 324 carries information for the transport formats used for the transport channels carried by the downlink DPCH in the current frame. The transport format information for each transport channel remains constant over the TTI for that transport channel. The wireless device uses the transport format information to process (e.g., decode) the transport blocks sent on the transport channels. The base station may elect to omit (not send) the transport format information. In this case, the wireless device performs blind transport format detection (BTFD) to recover the transmitted transport blocks. For BTFD, the wireless device processes the received block for each transport channel in accordance with each of the possible transport formats for that transport channel and provides a decoded block for the transport format deemed most likely to have been used for that transport channel. The wireless device uses the CRC (if any) included in the transport block to aid with BTFD. BTFD is used for a voice call in W-CDMA and may also be used for other types of call.

1. Erasure Detection

For a voice call, control data for the DCCH is sent on TrCh D using one of two transport formats, which are called 1x148 and 0x148. The 1x148 format is for transmission of a transport block with CRC. The 0x148 format is for transmission of a DTX block without CRC.

The wireless device performs BTFD for each transport channel for which the transport format information is not known. For example, the wireless device performs BTFD for TrCh D at all times in order to ensure that all transport blocks sent on this transport channel can be recovered. The wireless device attempts to decode each received block on TrCh D, performs CRC test/check on each decoded block, and provides one of two possible outcomes for the received block:

CRC success—indicates that the decoded block passes the CRC test, and

CRC failure—indicates that the decoded block fails the CRC test.

A CRC success occurs if a transport block was sent using the 1x148 format and was successful decoded by the wireless device. A CRC failure may result from either (1) a transport block being sent with the 1x148 format but being decoded in error by the wireless device or (2) a DTX block being sent with the 0x148 format. Since the wireless device does not know whether the received block was sent with the 1x148 format or the 0x148 format, there is ambiguity as to whether the CRC failure was due to case (1) or (2) above. When a CRC failure is encountered, it may be necessary to reliably determine whether the received block is an erased block, which is a transport block that was transmitted but decoded in error, or a DTX block. Table 1 lists the possible status for a received block when the transport format is unknown.

TABLE 1

| Block Status | Description |
| --- | --- |
| Good | The received block passes the CRC test. |
| DTX | The received block fails the CRC test and is deemed to be for a non-transmitted block. |
| Erasure | The received block fails the CRC test and is deemed to be for a transport block transmitted but decoded in error. |

The wireless device performs erasure detection to determine whether a received block with CRC failure is an erased block or a DTX block. The erasure detection may be performed based on various metrics such as SER, energy metric (EM), zero state bit (ZSB), and so on.

SER is the ratio of the number of symbol errors in a received block over the total number of symbols in the block. At the base station, data bits in a transport block are encoded to generate symbols, which are further processed and transmitted. At the wireless device, the received symbols for the received block are decoded to obtain decoded bits, which may be re-encoded in the same manner performed by the base station to generate re-encoded symbols. The wireless device may slice the received symbols to obtain hard-decision symbols (each having a value of either '0' or '1'), compare the hard-decision symbols against the re-encoded symbols to identify symbol errors, and compute the SER for the received block. If all transport blocks contain the same number of symbols, which is the case for TrCh D, then the number of symbol errors may be used directly as the SER, instead of having to be normalized by the total number of symbols in the block. In the following description, the number of symbol errors and SER are used interchangeably.

The energy metric for a received block may be computed in various manners. In one embodiment, the energy metric is computed by (1) determining the energy of each received symbol in the block and (2) accumulating the energies of all received symbols in the block. In another embodiment, the energy metric is computed by (1) determining the energy of all "good" received symbols having the same polarity as the corresponding re-encoded symbols, (2) determining the energy of all "bad" received symbols having opposite polarity as the corresponding re-encoded symbols, and (3) subtracting the bad received symbol energy from the good received symbol energy to obtain the energy metric. In yet another embodiment, the energy metric is computed by (1) multiplying each received symbol in the block with the corresponding re-encoded symbol to obtain a correlated energy for the received symbol and (2) accumulating the correlated energies for all received symbols in the block to obtain the energy metric. In general, the energy metric is an estimate of the actual received energy for the block and may be computed in various manners. The energy metric may also be called block energy or by some other terminology.

The zero state bit indicates whether a Viterbi decoder encounters a known state for a received block. Each transport block is appended with K−1 tail bits (which are typically all zeros) prior to encoding by a convolutional encoder with a constraint length of K. The zero state bit is set to '1' if the Viterbi decoder correctly obtains all zeros for the K−1 tail bits and set to '0' otherwise. If the CRC fails but the zero state bit is set, then the received block is more likely to be an erased block than a DTX block.

In general, any number of metrics and any type of metric may be used for erasure detection. For clarity, the following description is for erasure detection using the energy metric, SER, and zero state bit.

Figure 4A:
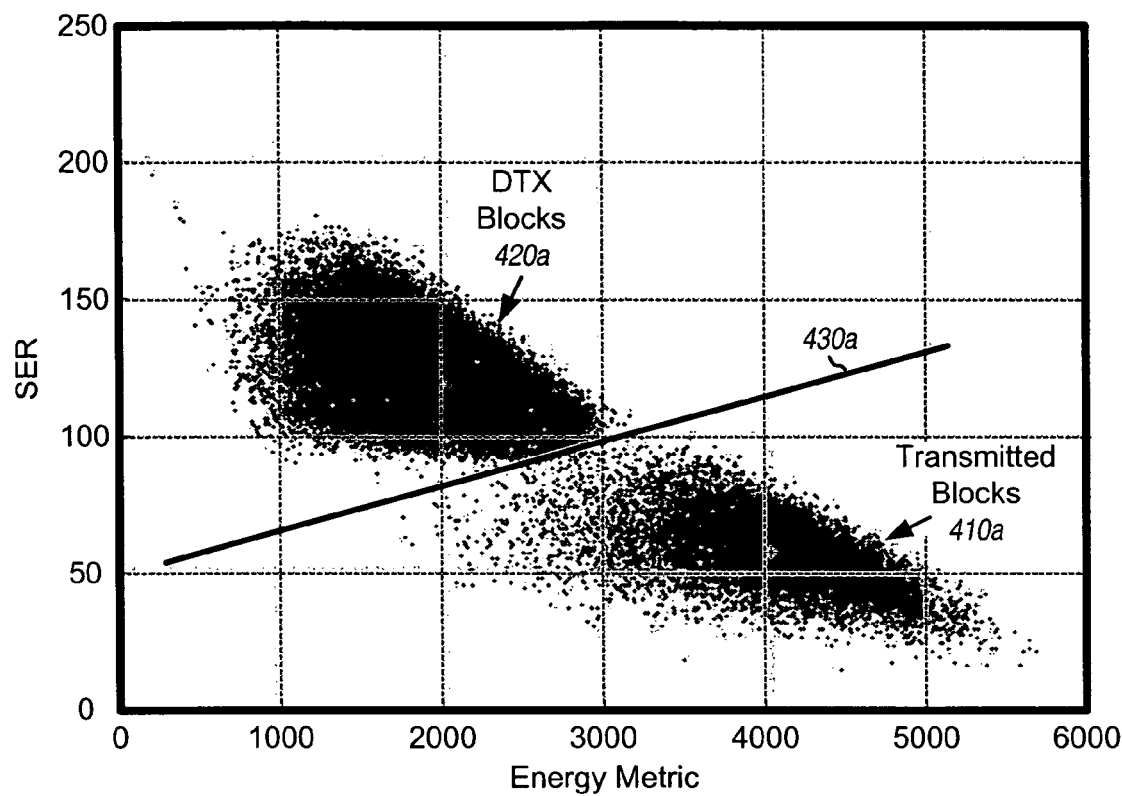
FIGS. 4A and 4B show distributions of transmitted blocks and DTX blocks for two different operating scenarios.
Figure 4B:
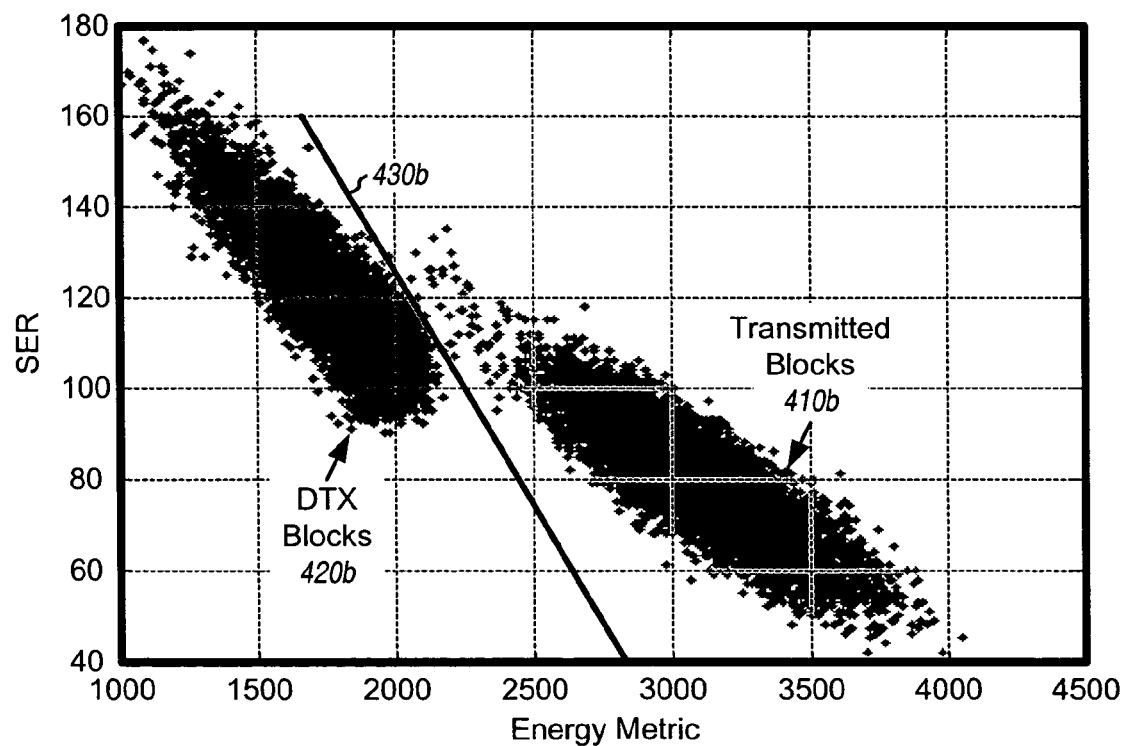

FIGS. 4A and 4B show distributions of transmitted transport blocks (or simply, transmitted blocks) and DTX blocks for two different operating scenarios. For each figure, the horizontal axis represents energy metric and the vertical axis represents the number of symbol errors (or SER). For each operating scenario, the energy metric and number of symbol errors are determined for a large collection of transmitted blocks (sent with the 1x148 format) and DTX blocks (sent with the 0x148 format) on TrCh D for a voice call. For each operating scenario, each transmitted block and each DTX block is plotted in the associated figure at a coordinate determined by its energy metric and number of symbol errors.

As shown in FIGS. 4A and 4B, the distribution of transmitted blocks for each operating scenario, when plotted using the energy metric and number of symbol errors, forms a cluster 410. Similarly, the distribution of DTX blocks for each operating scenario forms another cluster 420. The energy of a DTX block tends to be lower than the energy of a transmitted block, and the number of symbol errors for a DTX block tends to be higher than the number of symbol errors for a transmitted block. The erased blocks tend to be at the top left tail of the transmitted block cluster.

Figure 5A:
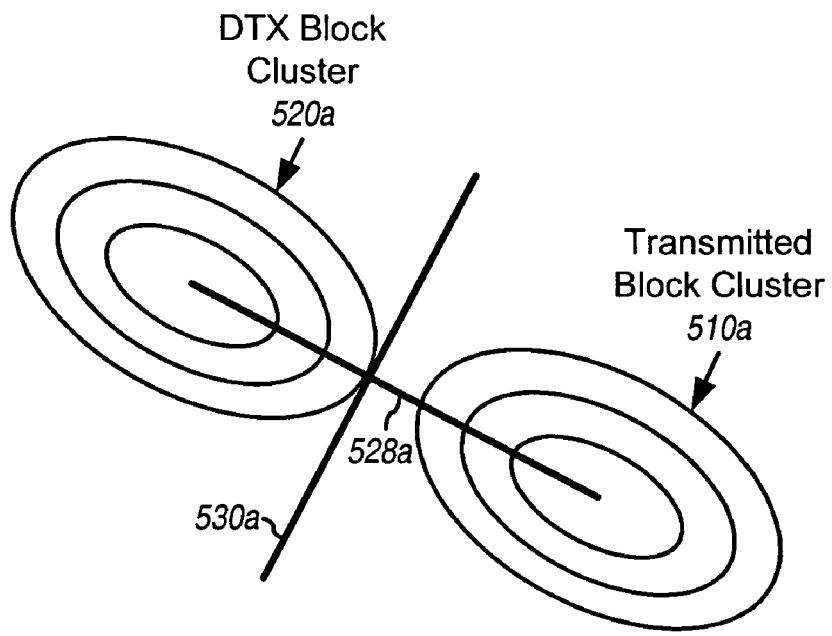
FIGS. 5A and 5B show models of the distributions shown in FIGS. 4A and 4B, respectively.
Figure 5B:
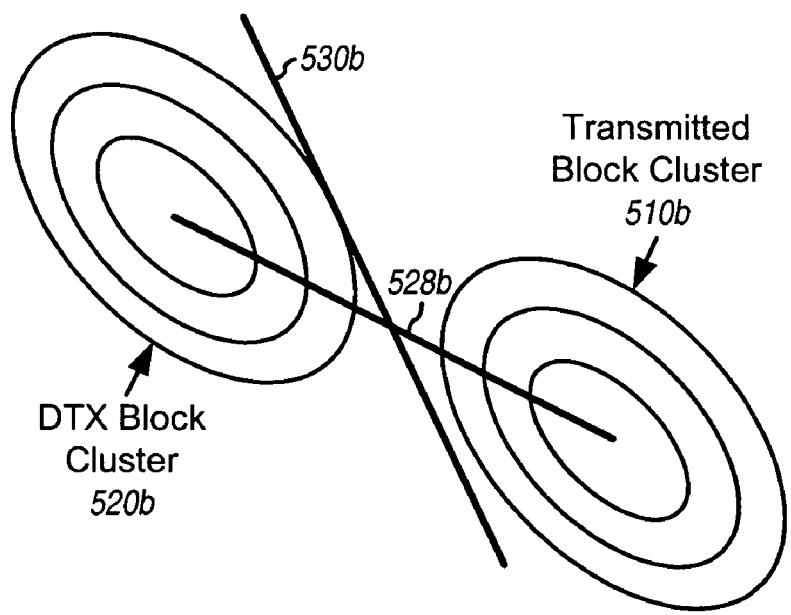

FIGS. 5A and 5B show models of the distributions of transmitted and DTX blocks shown in FIGS. 4A and 4B, respectively. For each figure, a "connecting" line 528 is drawn from the center of the cluster of transmitted blocks 510 to the center of the cluster of DTX blocks 520. The energy metric may be approximated by a Gaussian random variable x, and the number of symbol errors may be approximated by a Gaussian random variable y. If random variables x and y are uncorrelated, then a "decision" line 530 may be drawn perpendicular to connecting line 528 and used to optimally delineate transmitted block cluster 510 and DTX block cluster 520. If variables x and y are correlated, then decision line 530 may be drawn at an angle to connecting line 528 and used to delineate transmitted block cluster 510 and DTX block cluster 520. The slope and placement of decision line 530 may be determined as described below.

For a voice call, transport blocks are only sent intermittently (e.g., less than 1% of the time) on TrCh D. Consequently, DTX blocks are more common, and statistics can be more readily obtained for received blocks with CRC failures.

The means and variances of the energy metric and SER for received blocks with CRC failures may be estimated as follows:

$$\hat{\mu}_{em} = \frac{1}{N} \cdot \sum_{i=1}^{N} e_i \text{ and } \hat{\sigma}_{em}^2 = \frac{1}{N-1} \cdot \sum_{i=1}^{N} (e_i - \hat{\mu}_{em})^2, \quad \text{Eq (1)}$$

and $$\hat{\mu}_{ser} = \frac{1}{N} \cdot \sum_{i=1}^{N} s_i \text{ and } \hat{\sigma}_{ser}^2 = \frac{1}{N-1} \cdot \sum_{i=1}^{N} (s_i - \hat{\mu}_{ser})^2, \quad \text{Eq (2)}$$

where $e_i$ and $s_i$ are respectively the energy metric and SER for received block i with CRC failure, $\hat{\mu}_{em}$ and $\hat{\sigma}_{em}^2$ are respectively the estimated mean and variance of the energy metric, $\hat{\mu}_{ser}$ and $\hat{\sigma}_{ser}^2$ are respectively the estimated mean and variance of the SER, and N is the number of received blocks with CRC failures used to compute the means and variances.

Normalized random variables $x_i$ and $y_i$ for the energy metric and SER, respectively, for received block i may be computed as follows:

$$x_i = \frac{e_i - \hat{\mu}_{em}}{\hat{\sigma}_{em}}, \text{ and} \quad \text{Eq (3)}$$

$$y_i = \frac{s_i - \hat{\mu}_{ser}}{\hat{\sigma}_{ser}}. \quad \text{Eq (4)}$$

Each of the random variables $x_i$ and $y_i$ has (1) zero mean due to the subtraction by the estimated mean of the variable and (2) unit variance due to the division by the estimated standard deviation of the variable.

The random variables $x_i$ and $y_i$ may be correlated. The amount of correlation between these two random variables may be quantified by a correlation coefficient, which may be computed as follows:

$$\hat{\rho} = \frac{1}{N} \cdot \sum_{i=1}^{N} x_i \cdot y_i, \quad \text{Eq (5)}$$

where $\hat{\rho}$ is the estimated correlation coefficient for random variables $x_i$ and $y_i$. The magnitude of $\hat{\rho}$ indicates the amount of correlation between $x_i$ and $y_i$, with $\hat{\rho}=0$ indicating no correlation. The correlation coefficient may be constrained to be within a range of $-1.0$ to $+1.0$, or $1.0 > \hat{\rho} > -1.0$.

The correlated random variables $x_i$ and $y_i$ may be transformed to uncorrelated random variables $u_i$ and $v_i$, as follows:

$$\begin{pmatrix} u_i \\ v_i \end{pmatrix} = \begin{pmatrix} a_{11} & a_{12} \\ a_{21} & a_{22} \end{pmatrix} \cdot \begin{pmatrix} x_i \\ y_i \end{pmatrix} = \begin{pmatrix} 0 & 1 \\ \frac{1}{\sqrt{1-\hat{\rho}^2}} & \frac{-\hat{\rho}}{\sqrt{1-\hat{\rho}^2}} \end{pmatrix} \cdot \begin{pmatrix} x_i \\ y_i \end{pmatrix}, \quad \text{Eq (6)}$$

where $$\begin{pmatrix} a_{11} & a_{12} \\ a_{21} & a_{22} \end{pmatrix}$$

is a 2×2 transformation matrix containing elements determined by the estimated correlation coefficient $\hat{\rho}$. The uncorrelated random variables $u_i$ and $v_i$ have zero means, unit variances, and circular Gaussian distribution. For the uncorrelated random variables $u_i$ and $v_i$ obtained by the transformation shown in equation (6), the decision line that optimally delineates the transmitted block cluster and the DTX block cluster is perpendicular to the connecting line between the centers of these two clusters. This simplifies the determination of the decision line.

The erasure detection ascertains whether a received block with CRC failure is an erased block or a DTX block. Table 2 lists two possible types of error that can occur for erasure detection.

TABLE 2

| Error Type | Description |
| --- | --- |
| False Alarm | DTX → Erasure. A received block is declared as an erased block when in actuality it is a DTX block. |
| Missed Detection | Erasure → DTX. A received block is declared as a DTX block when in actuality it is an erased block. |

For power control, a false alarm causes an increase in the SIR target because a DTX block is erroneously declared as an erased block. The higher SIR target causes an increase in transmit power for the downlink transmission and reduces network capacity. A missed detection may cause the transmit power to be maintained at the same level when it should be increased, since an erased block is declared as a DTX block. The lower transmit power increases the likelihood of receiving additional transport blocks in error, which can degrade performance. A false alarm may be considered to be more detrimental than a missed detection. This is because false alarms can cause the downlink transmit power to be set abnormally high for a long time, and a sufficiently high false alarm rate can cause instability. A missed detection may be considered to be less detrimental than a false alarm, since it only affects a single user even though the effect may be severe. The erasure detection may be designed with the goals of maintaining the probability of false alarm ($P_{FA}$) at or below a target value (e.g., 0.1%) while minimizing the probability of missed detection ($P_{MD}$).

If statistics for both DTX blocks and transmitted blocks are available, then a connecting line may be drawn between the DTX block cluster and the transmitted block cluster for the uncorrelated random variables u and v, and a decision line may be drawn perpendicular to this connection line. If statistics for only DTX blocks are available, then a circular decision line may be drawn around the center of the DTX block cluster. To simplify the erasure detection, the circular decision line may be appropriated with multiple straight lines, as described below.

The distance of the decision line from the center of the DTX block cluster may be determined based on the desired false alarm probability. To achieve a false alarm probability of less than $\alpha$, or $P_{FA} < \alpha$, the decision line may be drawn at a distance of d from the center of the DTX block cluster. If the DTX cluster is a circular Gaussian distribution, then distance d may be computed as follows:

$$Q(d) = \alpha \text{ or } d = Q^{-1}(\alpha), \quad \text{Eq (7)}$$

where Q(d) is an integral of a normal Gaussian distribution function from d to infinity. The Q-function is known in the art. In general, distance d may be determined based on equation (7), computer simulation, empirical measurements, and so on.

The zero state bit may be used for erasure detection. Simulations have shown that the zero state bit provides little information for DTX blocks but is set to '1' for more than half of all erased blocks for different operating scenarios. Thus, two decision lines may be defined for the two possible values ('0' and '1') of the zero state bit. The decision line for the '1' zero state bit may be drawn in a manner to achieve a higher likelihood of declaring erased blocks.

In an embodiment, the decision line is defined based on statistics for only DTX blocks and is approximated by three straight lines—a vertical line, a horizontal line, and a slanted line. Received block i with CRC failure is declared as an erased block if any one of the following three decision criteria is satisfied:

$$u_i < U_{th}, \quad \text{Eq (8)}$$

$$v_i > V_{th}, \quad \text{Eq (9)}$$

$$v_i - s \cdot u_i > T_{th}, \quad \text{Eq (10)}$$

where $U_{th}$, $V_{th}$, and $T_{th}$ are three thresholds for the vertical, horizontal, and slanted lines, respectively, and s is the slope of the slanted line. Received block i is declared as a DTX block if none of the decision criteria are met.

Figure 6:
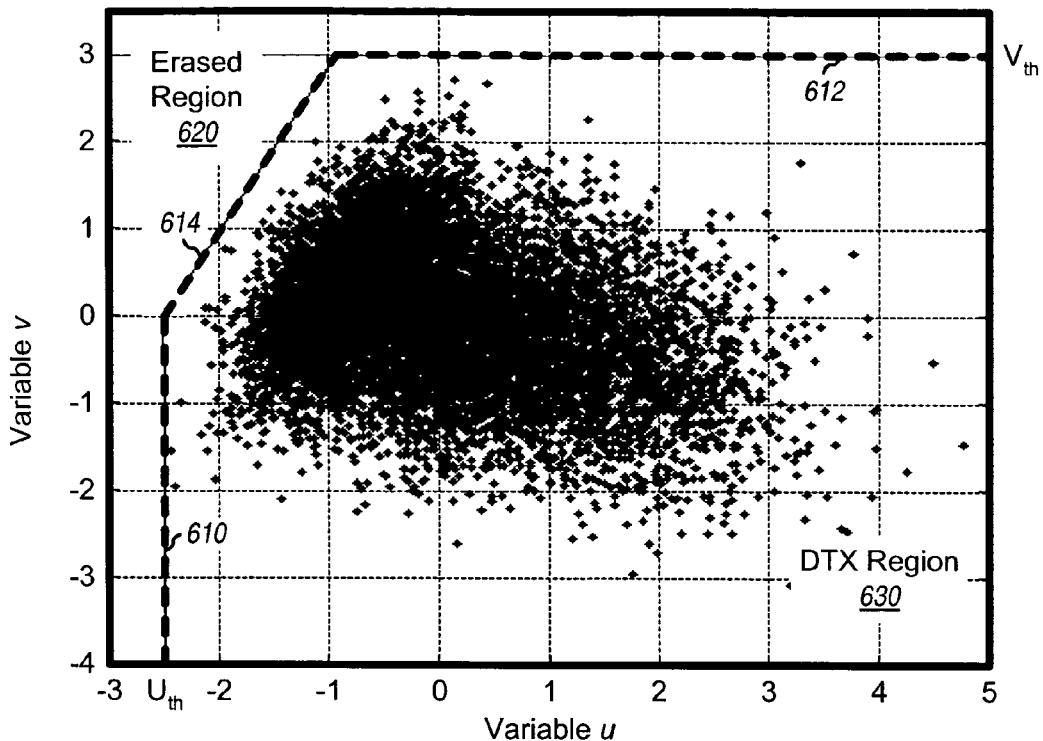
FIG. 6 shows distribution of uncorrelated random variables for DTX blocks.

FIG. 6 shows a distribution of the uncorrelated random variables $u_i$ and $v_i$ for DTX blocks for a specific operating scenario. The horizontal axis represents random variable u and the vertical axis represents random variable v. FIG. 6 thus shows the energy metric and SER for the DTX blocks in a transformed domain. The distribution of DTX blocks is an approximately constant cluster after the transformation to the uncorrelated random variables u and v. Although not shown in FIG. 6, the cluster for the transmitted blocks lies to the left and above the DTX block cluster after the transformation. The decision line may then be approximated by (1) a vertical line 610 that crosses the horizontal axis at $u=U_{th}$, (2) a horizontal line 612 that crosses the vertical axis at $v=V_{th}$, and (3) a slanted line 614 that has a slope of s and crosses the vertical axis at $v=T_{th}$. Received block i is an erased block if its $(u_i, v_i)$ coordinate falls within an erased region 620 that includes the area to the left of line 610 and the area above lines 612 and 614. Received block i is a DTX block if its $(u_i, v_i)$ coordinate falls within a DTX region 630 bounded by lines 610, 612, and 614.

The three thresholds may be defined, for example, as $U_{th}=-2.5 \cdot \gamma$, $V_{th}=3.0 \cdot \gamma$, and $T_{th}=5.75 \cdot \gamma$, where $\gamma$ is a scaling factor that is determined by the zero state bit. This scaling factor may be set, for example, as $\gamma=1.0$ if the zero state bit is set to '0' and $\gamma=0.65$ if the zero state bit is set to '1'. If the zero state bit for received block i is set to '1', then the received block is less likely to be a DTX block, and DTX region 630 is reduced by pulling lines 610, 612, and 614 toward the center of the DTX block cluster. In general, the thresholds and the scaling factor $\gamma$ may be determined by computer simulation, theoretical calculation, empirical measurements, and so on.

Equations (8) through (10) show an exemplary set of decision criteria that may be used for erasure detection. Erasure detection may also be achieved with a single decision criterion, e.g., shown in equation (10). In general, erasure detection may be achieved with any number of decision criteria. The decision criteria may be defined in various manners depending on various factors such as, e.g., the available statistics (e.g., for only DTX blocks or for both DTX and erased blocks), the manner in which the random variables are computed, the manner in which the decision line is defined, and so on.

Figure 7:
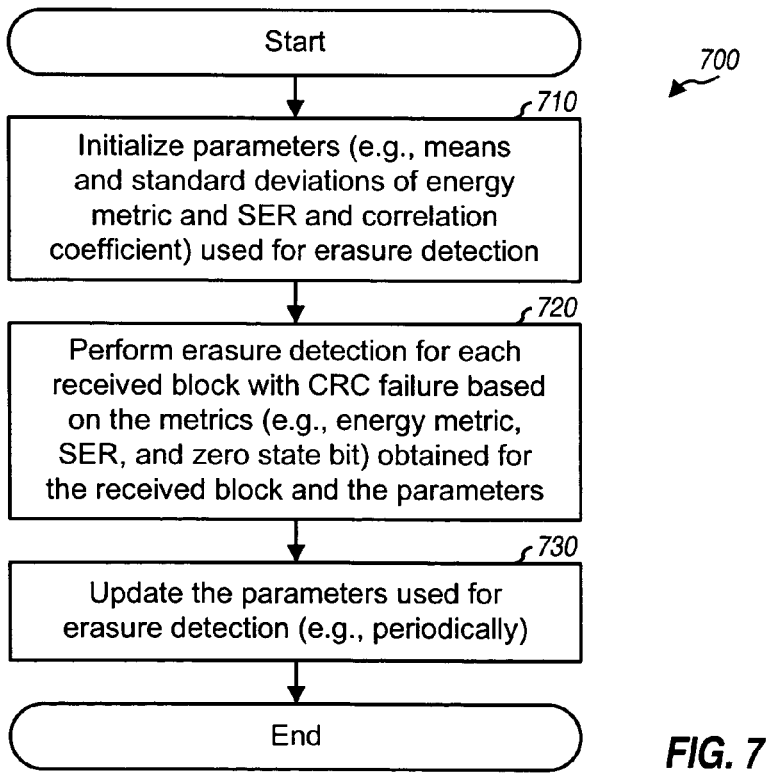
FIG. 7 shows a process for performing erasure detection for a transport channel.

FIG. 7 shows a process 700 for performing erasure detection for a transport channel with unknown format using the techniques described herein. The various parameters used for erasure detection are initialized (block 710). This initialization may entail computing (a) the mean and standard deviation of the energy metric as shown in equation (1), (b) the mean and standard deviation of the SER as shown in equation (2), (c) the correlation coefficient as shown in equation (5), and (d) the transformation matrix as shown in equation (6). The parameters may be initialized based on metrics obtained for a predetermined number of (e.g., $N_{init}=16$) received blocks with CRC failure. Erasure detection is then performed for each received block with CRC failure based on the metrics (e.g., the energy metric, SER, and zero state bit) obtained for the received block and the parameters, as described below (block 720). The parameters used for erasure detection are periodically updated, as also described below (block 730).

Figure 8:
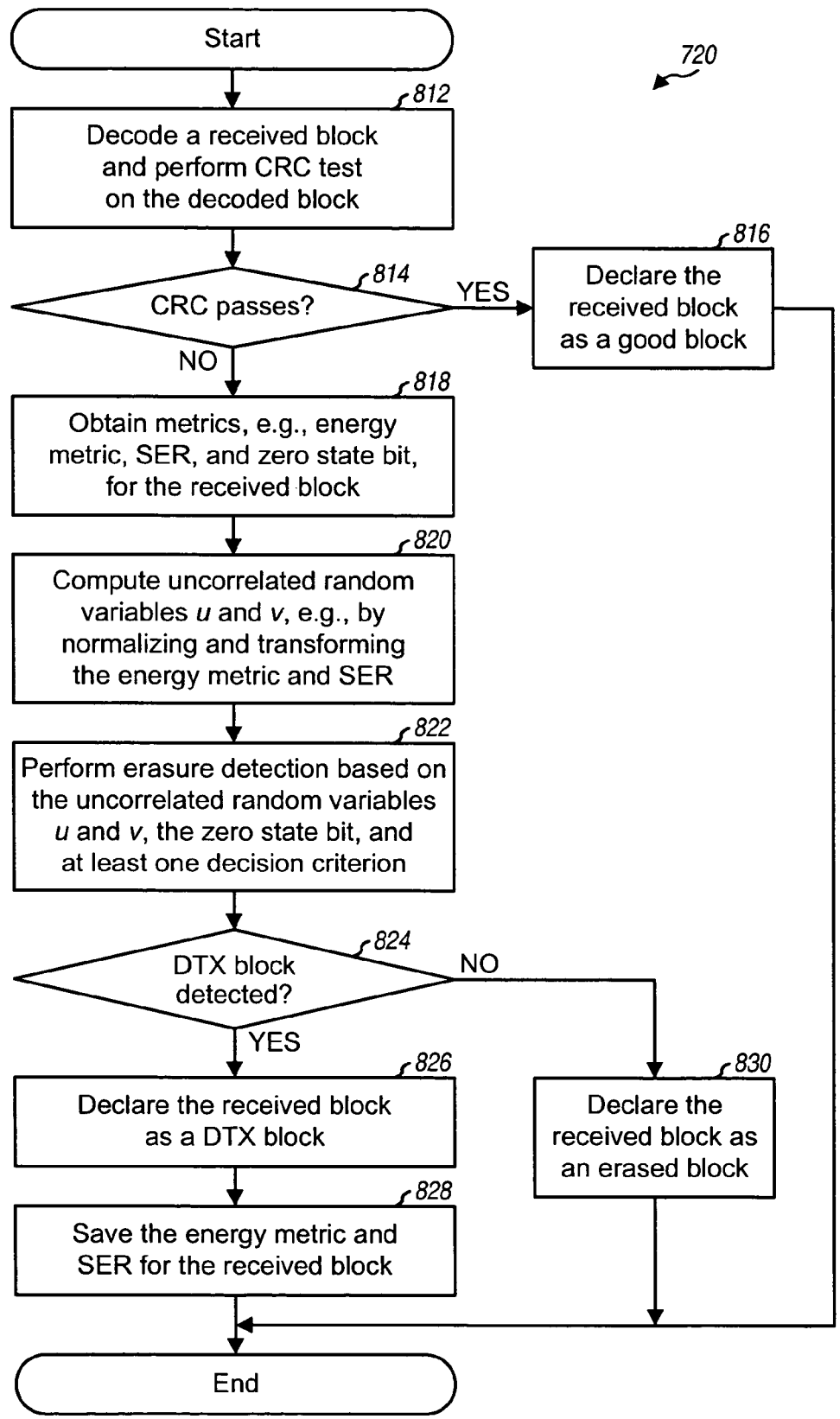
FIG. 8 shows a process for performing erasure detection for a received block.

FIG. 8 shows a process for performing erasure detection for a received block, which is an embodiment of block 720 in FIG. 7. Initially, the received block is decoded to obtain a decoded block, and a CRC test is performed on the decoded block (block 812). A determination is then made whether the CRC passes (block 814). If the CRC passes, then the received block is declared as a good block (block 816), and the process terminates. Otherwise, the energy metric, SER, and zero state bit for the received block are obtained, e.g., from the Viterbi decoder (block 818).

The uncorrelated random variables u and v are computed by normalizing and transforming the energy metric and SER (block 820). This may entail (a) computing the correlated random variable x based on the energy metric and the mean and standard deviation of the energy metric, as shown in equation (3), (b) computing the correlated random variable y based on the SER and the mean and standard deviation of the SER, as shown in equation (4), and (c) transforming the correlated random variables x and y, as shown in equation (6). Erasure detection is then performed for the received block based on the random variables u and v, the zero state bit, and at least one decision criterion, e.g., as shown in equations (8) through (10) (block 822).

If a DTX block is detected by the evaluation in block 822 and the answer is 'Yes' for block 824, then the received block is declared as a DTX block (block 826). As noted above, the parameters may be updated based on the metrics obtained for received blocks that have been detected as DTX blocks. In this case, the energy metric and SER for the received block are saved for use to update the parameters (block 828). Otherwise, if the answer is 'No' for block 824, then the received block is declared as an erased block (block 830).

The parameters $\hat{\mu}_{em}$, $\hat{\sigma}_{em}$, $\hat{\mu}_{ser}$, $\hat{\sigma}_{ser}$ and $\hat{\rho}$ used for erasure detection may be updated in various manners. For example, these parameters may be updated after each detected DTX block, after a predetermined number of detected DTX blocks, at fixed time intervals, and so on. An update interval is the time interval in which the parameters are updated and may span any number of received blocks. In an embodiment, the parameters are updated after $N_{update}=8$ DTX blocks have been detected and based on an infinite impulse response (IIR) filter. For each update interval, the mean and variance of the energy metric, the mean and variance of the SER, and the correlation coefficient are computed based on the energy metric and SER for the DTX blocks received in that update interval, as shown in equations (1), (2) and (5). The parameters are then updated using the IIR filter, as follows:

$$\hat{\mu}_{em}(n+1)=(1-\beta)\cdot\hat{\mu}_{em}(n)+\beta\cdot\hat{\mu}_{em,int},  \quad \text{Eq (11)}$$

$$\hat{\sigma}_{em}(n+1)=(1-\beta)\cdot\hat{\sigma}_{em}(n)+\beta\cdot\hat{\sigma}_{em,int},  \quad \text{Eq (12)}$$

$$\hat{\mu}_{ser}(n+1)=(1-\beta)\cdot\hat{\mu}_{ser}(n)+\beta\cdot\hat{\mu}_{ser,int},  \quad \text{Eq (13)}$$

$$\hat{\sigma}_{ser}(n+1)=(1-\beta)\cdot\hat{\sigma}_{ser}(n)+\beta\cdot\hat{\sigma}_{ser,int}, \text{ and}  \quad \text{Eq (14)}$$

$$\hat{\rho}(n+1)=(1-\beta)\cdot\hat{\rho}(n)+\beta\cdot\hat{\rho}_{int},  \quad \text{Eq (15)}$$

where $\hat{\mu}_{em,int}$, $\hat{\sigma}_{em,int}$, $\hat{\mu}_{ser,int}$, $\hat{\sigma}_{ser,int}$ and $\hat{\rho}_{int}$ are parameters computed based on the DTX blocks received in the current update interval;

$\hat{\mu}_{em}(n)$, $\hat{\sigma}_{em}(n)$, $\hat{\mu}_{ser}(n)$, $\hat{\sigma}_{ser}(n)$ and $\hat{\rho}(n)$ are the parameters used for erasure detection in the current update interval n;

$\hat{\mu}_{em}(n+1)$, $\hat{\sigma}_{em}(n+1)$, $\hat{\mu}_{ser}(n+1)$, $\hat{\sigma}_{ser}(n+1)$ and $\hat{\rho}(n+1)$ are the parameters used for erasure detection in the next update interval n+1; and $\beta$ is a coefficient for the IIR filter.

The parameters $\beta$ and $N_{update}$ determine the amount of averaging for the means and variances of the energy metric and SER. A small value for $\beta$ and/or a large value for $N_{update}$ correspond to more (or longer term) averaging, which increases the accuracy of the estimated means and variances for static and slow-varying channels. Conversely, a large value for $\beta$ and/or a small value for $N_{update}$ correspond to less (or shorter term) averaging, which improves the tracking of the means and variances to changes in the wireless environment. Variances are second order statistics that require more samples for accurate estimation than first order statistics such as means. The parameters $\beta$ and $N_{update}$ may be selected based on various factors, such as those noted above. The filter coefficient may be set, for example, as $\beta=0.08$. The means and variances are then effectively computed over $N_{update}/\beta=8/0.08=100$ DTX blocks. Other values may also be used for $\beta$ and $N_{update}$.

Equations (11) through (15) shows the parameters $\hat{\mu}_{em}$, $\hat{\sigma}_{em}$, $\hat{\mu}_{ser}$, $\hat{\sigma}_{ser}$ and $\hat{\rho}$ being updated based on the parameters $\hat{\mu}_{em,int}$, $\hat{\sigma}_{em,int}$, $\hat{\mu}_{ser,int}$, $\hat{\sigma}_{ser,int}$ and $\hat{\rho}_{int}$ for received blocks detected to be DTX blocks. In general, the parameters $\hat{\mu}_{em}$, $\hat{\sigma}_{em}$, $\hat{\mu}_{ser}$, $\hat{\sigma}_{ser}$ and $\hat{\rho}$ may be updated based on parameters for any types of received blocks, e.g., received blocks detected to be DTX blocks, erased blocks, and/or good blocks.

In equations (3) and (4), the computation of the correlated random variables $x_i$ and $y_i$ for each received block with CRC failure requires two divide operations, or a divide by $\hat{\sigma}_{em}$ for $x_i$ and a divide by $\hat{\sigma}_{ser}$ for $y_i$. Furthermore, the computation of the uncorrelated random variable $v_i$ in equation (6) requires two divide by $\sqrt{1-\hat{\rho}^2}$ operations. All of these divide operations may be avoided by defining the correlated and uncorrelated random variables as follows:

$$x'_i = x_i \cdot \hat{\sigma}_{em} \cdot \hat{\sigma}_{ser} \cdot \sqrt{1-\hat{\rho}^2} = (e_i-\hat{\mu}_{em})\cdot\hat{\sigma}_{ser}\cdot\sqrt{1-\hat{\rho}^2},  \quad \text{Eq (16)}$$

$$y'_i = y_i \cdot \hat{\sigma}_{em} \cdot \hat{\sigma}_{ser} \cdot \sqrt{1-\hat{\rho}^2} = (s_i-\hat{\mu}_{ser})\cdot\hat{\sigma}_{em}\cdot\sqrt{1-\hat{\rho}^2},  \quad \text{Eq (17)}$$

$$u'_i = u_i \cdot \hat{\sigma}_{em} \cdot \hat{\sigma}_{ser} \cdot \sqrt{1-\hat{\rho}^2} = (s_i-\hat{\mu}_{ser})\cdot\hat{\sigma}_{em}\cdot\sqrt{1-\hat{\rho}^2}, \text{ and}  \quad \text{Eq (18)}$$

$$v'_i = v_i \cdot \hat{\sigma}_{em} \cdot \hat{\sigma}_{ser} \cdot \sqrt{1-\hat{\rho}^2} = (e_i-\hat{\mu}_{em})\cdot\hat{\sigma}_{ser}-(s_i-\hat{\mu}_{ser})\cdot\hat{\sigma}_{em}\cdot\hat{\rho},  \quad \text{Eq (19)}$$

As shown in equations (18) and (19), the uncorrelated random variables $u'_i$ and $v'_i$ may be computed directly from the energy metric and SER and without any divide operations. The random variables $u'_i$ and $v'_i$ have standard deviations of $\hat{\sigma}_{em}\cdot\hat{\sigma}_{ser}\cdot\sqrt{1-\hat{\rho}^2}$ instead of one. The thresholds used in the decision criteria may then be scaled by a factor of $S=\hat{\sigma}_{em}\cdot\hat{\sigma}_{ser}\cdot\sqrt{1-\hat{\rho}^2}$. For the embodiment described above in equations (8) through (10), the thresholds may be defined as: $U'_{th}=-2.5\cdot\gamma\cdot S$, $V'_{th}=3.0\cdot\gamma\cdot S$, and $T'_{th}=5.75\cdot\gamma\cdot S$.

The detection techniques described herein may be used for erasure detection, as described above. In general, these techniques are applicable to any problem where it is required to distinguish between two or more hypotheses based on two metrics that are correlated. A correlation coefficient is computed for the two metrics and used to distinguish between the two or more hypotheses, as described above. The detection techniques described herein may also be used for various applications. The use of the techniques for erasure detection for power control on the downlink is described below.

2. Power Control

Figure 9:
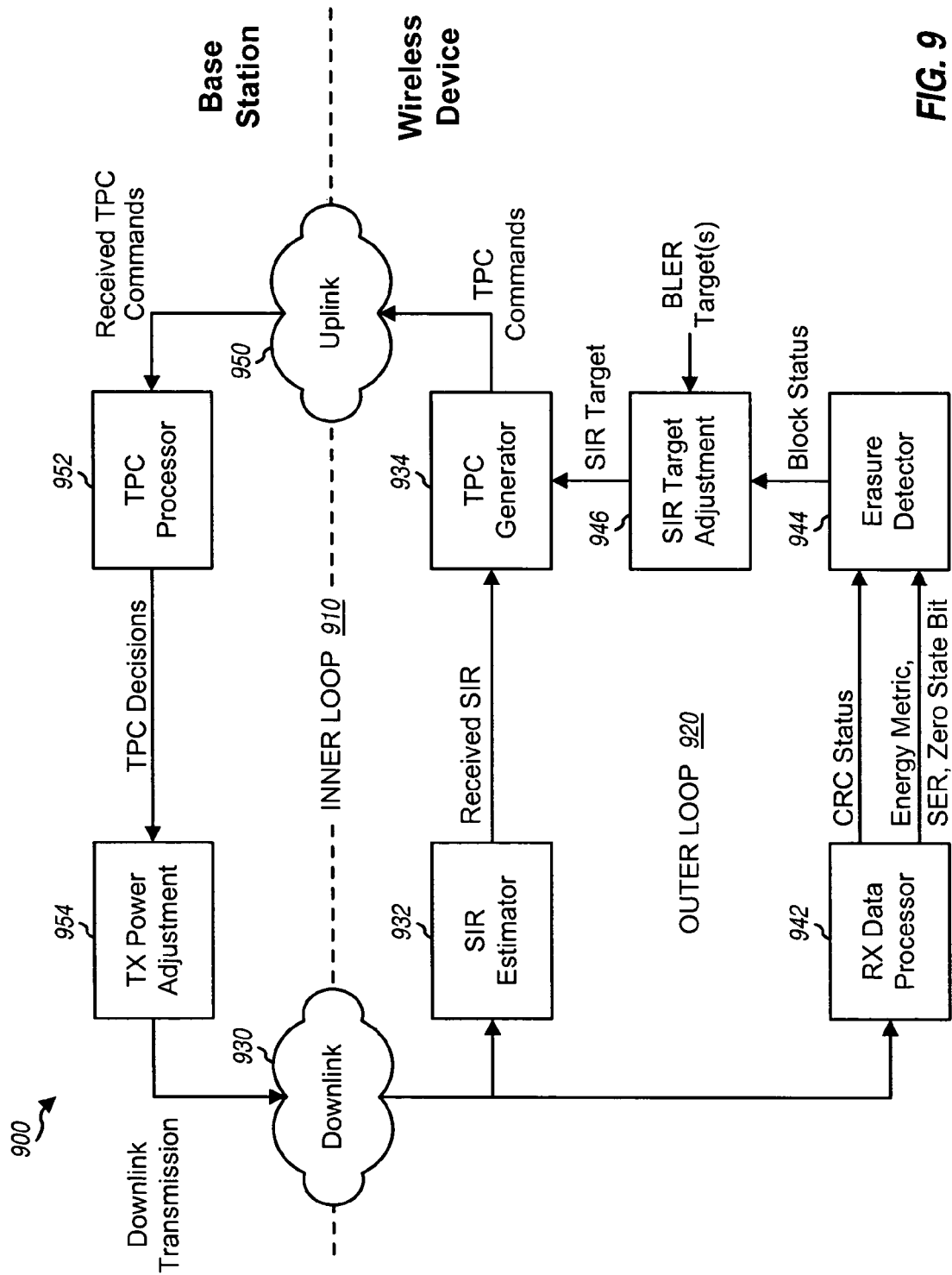
FIG. 9 shows a power control mechanism.

FIG. 9 shows a power control mechanism 900 that may be used to control the transmit power for a downlink transmission sent on a physical channel (e.g., the downlink DPCH) from a base station to a wireless device. Power control mechanism 900 includes an inner loop 910 and an outer loop 920.

Inner loop 910 maintains the received SIR for the downlink transmission, as measured at the wireless device, as close as possible to the SIR target for the physical channel. For inner loop 910, an SIR estimator 932 estimates the received SIR for the downlink transmission (e.g., based on the pilot sent in Pilot field 326 in FIG. 3) and provides the received SIR to a TPC generator 934. TPC generator 934 also receives the SIR target from an SIR target adjustment unit 946, compares the received SIR against the SIR target, and generates a TPC command based on the comparison result. The TPC command is either an UP command to direct an increase in transmit power for the downlink transmission or a DOWN command to direct a decrease in transmit power. One TPC command is generated for each slot and is sent on the uplink (cloud 950) to the base station.

The base station processes the uplink transmission from the wireless device and obtains a received TPC command for each slot. The received TPC command is a noisy version of the TPC command sent by the wireless device. A TPC processor 952 detects each received TPC command and provides a TPC decision, which indicates whether an UP command or a DOWN command was detected. A transmit (TX) power adjustment unit 954 adjusts the transmit power for the downlink transmission based on the TPC decision. Due to path loss and fading on the downlink (cloud 930), the received SIR at the wireless device continually fluctuates. Inner loop 910 attempts to maintain the received SIR at or near the SIR target in the presence of changes in the downlink.

Outer loop 920 continually adjusts the SIR target such that BLER target(s) are achieved for the downlink transmission on the physical channel. The physical channel carries one or more transport channels, and each transport channel may be associated with a respective BLER target. A receive (RX) data processor 942 processes and decodes each block received on each transport channel, checks each decoded block, and provides a CRC status that indicates either CRC success or CRC failure for the received block. For each received block with CRC failure and an unknown format, an erasure detector 944 determines whether the received block is an erased block or a DTX block, e.g., based on the energy metric, SER, and zero state bit provided by RX data processor 942.

The physical channel may carry any number of transport channels, and these transport channels may have various characteristics. Transport channels that use transport formats with CRC (e.g., TrChs A and D for a voice call) may be used for power control. Transport channels that use transport formats without CRC (e.g., TrChs B and C) are typically not used for power control. Table 3 lists three types of transport channels.

TABLE 3

| Transport Channel Type | Description | Block Status |
|---|---|---|
| Type 1 | A transport channel with CRC and is either (1) continuously active or (2) intermittently active but having known format. | Good or erased |
| Type 2 | A transport channel with CRC and is intermittently active with unknown format. | Good, erased, or DTX |
| Type 3 | A transport channel without CRC. | — |

A transport channel with CRC may be continuously active (e.g., TrCh A) or intermittently active (e.g., TrCh D). An intermittently active transport channel may have (1) a known format that is sent on the DPCCH or (2) an unknown format, in which case BTFD and erasure detection are performed for the transport channel. For a type 1 transport channel (e.g., TrCh A), each received block may be either a good block or an erased block. For a type 2 transport channel (e.g., TrCh D), each received block may be a good block, an erased block, or a DTX block.

Each type 1 and each type 2 transport channel may be associated with a respective SIR target that is dependent on (1) the BLER target specified for that transport channel, (2) the transport format used for the transport channel for the current TTI, (3) the channel condition, and (4) possibly other factors. For a given BLER target, different SIR targets may be needed for different channel conditions such as fast fading, slow fading, additive white Gaussian noise (AWGN) channel, and so on.

RX data processor 942 processes the downlink transmission, decodes the received blocks for each transport channel, checks each decoded block, and provides the CRC status (CRC success or failure) for each decoded block. For each type 2 transport channel, erasure detector 944 receives the CRC status and the metrics for each received block and provides a block status (good, erased, or DTX) for the received block. Adjustment unit 946 receives the block status and the BLER targets for type 1 and type 2 transport channels and determines the SIR target for the physical channel. Adjustment unit 946 adjusts the SIR target based on the block status and the BLER targets such that the desired performance is obtained for all transport channels. Adjustment unit 946 may adjust the SIR target using various schemes.

In a first scheme, one SIR target is maintained for each type 1 and each type 2 transport channel, and the SIR target for each transport channel is adjusted based on the received blocks for that transport channel. The SIR target for each type 1 transport channel may be increased by an UP step (e.g., 1 dB) for each erased block and decreased by a DOWN step (e.g., 0.01 dB) for each good block. The SIR target for each type 2 transport channel may be increased by an UP step for each erased block, decreased by a DOWN step for each good block, and maintained at the same level for a DTX block. The SIR target for the physical channel is set to the highest SIR target among all transport channels. In a second scheme, one SIR target is maintained for each type 1 transport channel, and the highest SIR target among all type 1 transport channels is increased whenever an erased block is detected on any type 2 transport channel. The SIR target for the physical channel is set to the highest SIR target among all type 1 transport channels. In a third scheme, one SIR target is maintained for all type 1 and type 2 transport channels, and this SIR target is adjusted based on received blocks for all of these transport channels. The SIR target is increased by the UP step if an erased block is received on any transport channel, maintained at the same level if only DTX blocks are detected, and decreased by the DOWN step if at least one good block and no erased blocks are detected. For the third scheme, the SIR target is adjusted primarily by received blocks for continuously active transport channels (e.g., TrCh A) and further updated based on received blocks for intermittently active transport channels (e.g., TrCh D) to achieve the desired performance for all transport channels. Other schemes may also be used to adjust the SIR target for the physical channel.

The DOWN and UP steps are dependent on the BLER target and the desired rate of convergence for the outer loop. A larger UP step may be used for a type 2 transport channel, which may carry important signaling such as TrCh D. The larger UP step size can ramp up the SIR target more quickly and improve decoding reliability for retransmission and/or new transmission on the type 2 transport channel.

Figure 10:
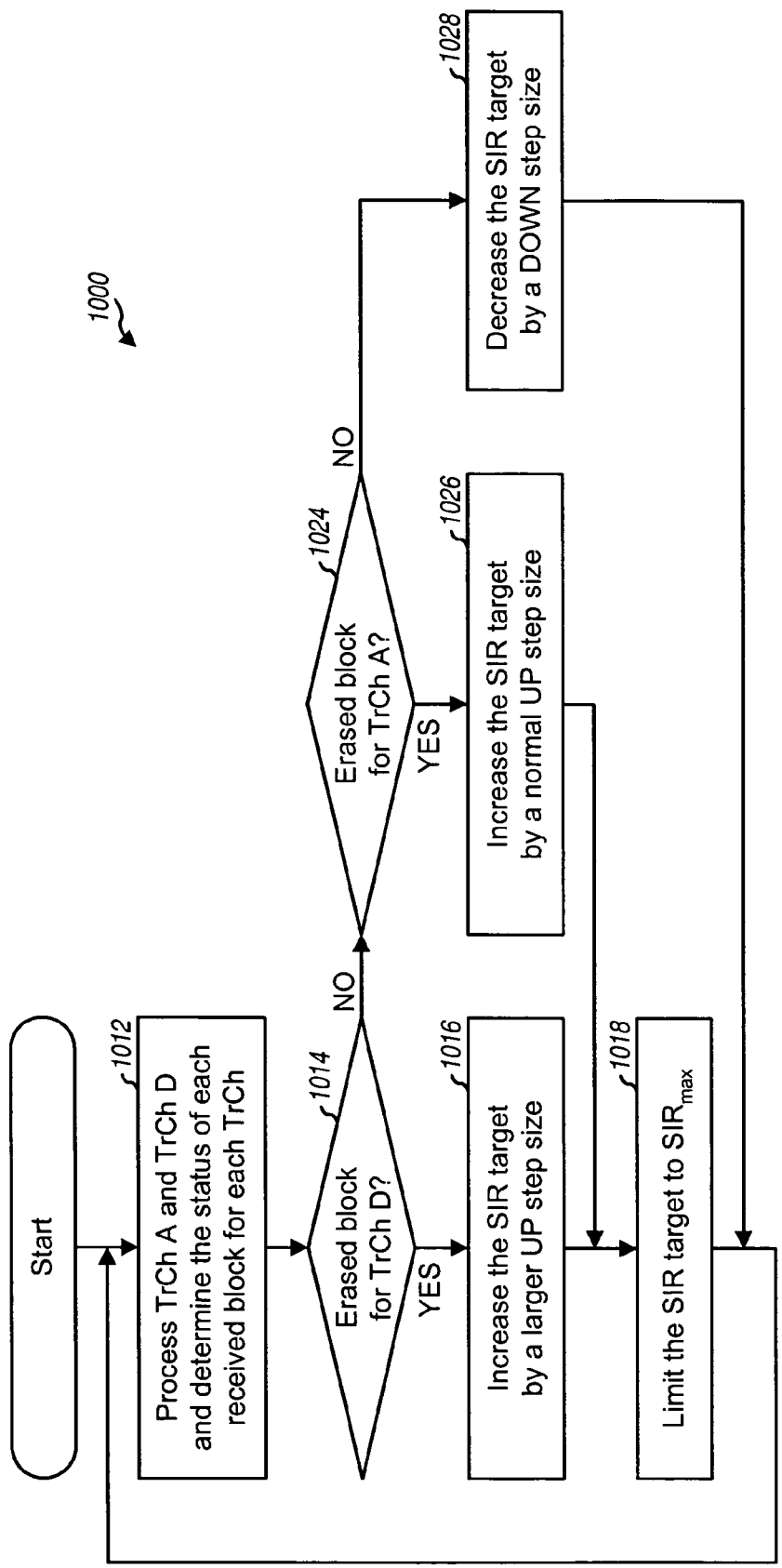
FIG. 10 shows a process for performing power control for the voice call.

FIG. 10 shows a process 1000 for performing power control for TrCh A and TrCh D for a voice call in W-CDMA. Process 1000 maintains a single SIR target for both TrChs A and D and implements the third scheme described above.

For each time interval in which at least one transport block is received on TrCh A and/or TrCh D, each received block for each transport channel is processed (e.g., decoded, CRC checked, and erasure detected) to determine the status of the received block (block 1012). The processing for TrCh D for block 1012 may be performed as shown in FIG. 8. If an erased block is obtained for TrCh D and the answer is 'Yes' for block 1014, then the SIR target is increased by the larger UP step size (block 1016). Otherwise, if an erased block is obtained for TrCh A and the answer is 'Yes' for block 1024, then the SIR target is increased by the normal UP step size (block 1026). The SIR target may be limited to $SIR_{max}$ (block 1018) to avoid instability, e.g., due to high false alarm rate for erasure detection. If the answer is 'No' for block 1024, which indicates that no erased block was received for either TrCh A or D and a good block was obtained for TrCh A and/or TrCh D, then the SIR target is decreased by the DOWN step size (block 1028). From blocks 1018 and 1028, the process returns to block 1012 to perform SIR adjustment for the next time interval. The SIR target from process 1000 is used to generate TPC commands, as shown in FIG. 9.

3. System

Figure 11:
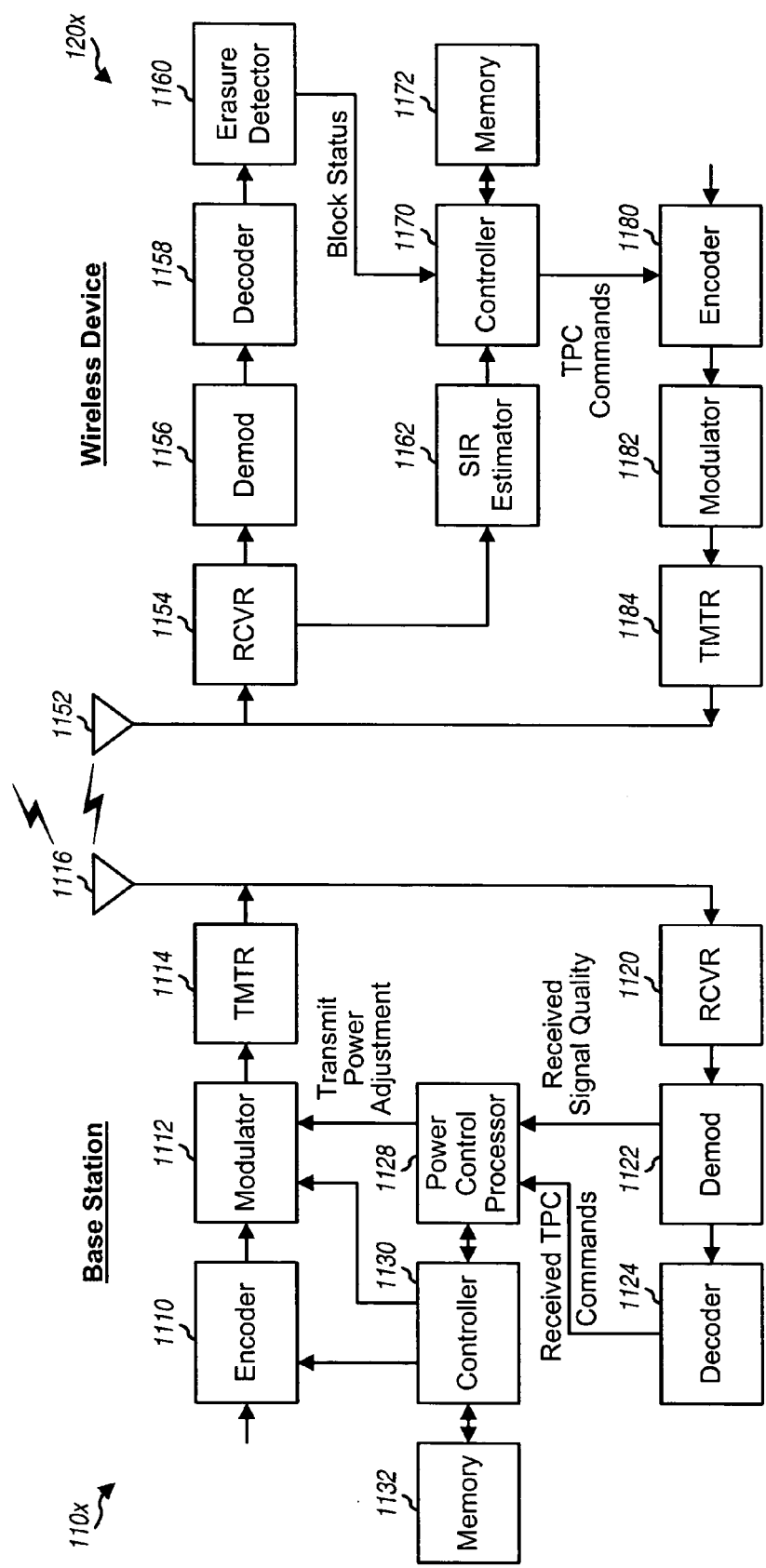
FIG. 11 shows a block diagram of a base station and a wireless device.

FIG. 11 shows a block diagram of an embodiment of a base station 110x and a wireless device 120x. On the downlink, an encoder 1110 receives transport blocks for one or more transport channels and processes (e.g., encodes, interleaves, and symbol maps) each transport block based on the applicable transport format. A modulator 1112 performs processing (e.g., channelization, spectral spreading, scrambling, and so on) for the physical channel carrying the transport channels and provides a stream of data chips. A transmitter unit (TMTR) 1114 conditions (e.g., converts to analog, amplifies, filters, and frequency upconverts) the data chips and generates a downlink signal, which is transmitted via an antenna 1116.

At wireless device 120x, an antenna 1152 receives the downlink signal and provides a received signal to a receiver unit (RCVR) 1154. Receiver unit 1154 conditions (e.g., filters, amplifies, and frequency downconverts) the received signal, digitizes the conditioned signal, and provides data samples. A demodulator (Demod) 1156 processes the data samples and provides received symbols (or symbol estimates). A decoder 1158 processes (e.g., demaps, deinterleaves, and decodes) the received symbols for each received block to obtain a decoded block, checks each decoded block, and provides the CRC status for each decoded block to an erasure detector 1160. Decoder 1158 also provides the energy metric, SER, and zero state bit for each received block with CRC failure to erasure detector 1160.

Erasure detector 1160 performs erasure detection for each received block with CRC failure and an unknown format and provides its block status (good, erased, or DTX) to a controller 1170. Erasure detector 1160 may implement processes 700 and 800 shown in FIGS. 7 and 8. SIR estimator 1162 estimates the received SIR for each physical channel used for data transmission and provides the received SIR to controller 1170. Controller 1170 performs power control, adjusts the SIR target based on the status of each received block, and generates TPC commands used to adjust the transmit power of the downlink physical channel.

On the uplink, an encoder 1180 receives and processes (e.g., encodes, interleaves, and symbol maps) various types of data. A modulator 1182 further processes the data from encoder 1180 and provides data chips. The TPC commands may be multiplexed with control data and transmitted on an uplink DPCCH. A transmitter unit 1184 processes the data chips and generates an uplink signal, which is transmitted via antenna 1152. At base station 110x, antenna 1116 receives the uplink signal and provides a received signal. The received signal is conditioned and digitized by a receiver unit 1120, processed by a demodulator 1122, and further processed by a decoder 1124 to recover the data and TPC commands sent by wireless device 120x. A power control processor 1128 receives the TPC commands and generates a control that adjusts the transmit power of the downlink transmission to wireless device 120x.

Controllers 1130 and 1170 direct the operation at base station 110x and wireless device 120x, respectively. Controller 1130 and 1170 may also perform various functions for erasure detection and power control for the uplink and downlink, respectively. Each controller may also implement the SIR estimator and/or erasure detector for its link. Memory units 1132 and 1172 store data and program codes for controllers 1130 and 1170, respectively.

The detection techniques described herein can improve the performance of a type 2 transport channel. The outer loop normally operates on only type 1 transport channels. A type 2 transport channel (e.g., TrCh D) is typically not considered for power control. The performance of the type 2 transport channel is then dependent on the SIR target set by the type 1 transport channels that are power controlled. In some instances, the SIR target set by the type 1 transport channels is too low for reliable transmission on the type 2 transport channel. This may cause the wireless device to miss important signaling messages and/or data and may further cause other deleterious effects. The problem is exacerbated, for example, if the wireless device attempts to add a data call during a long period of no activity for a voice call. For AMR, no activity requires a lower SIR than voice activity, and the SIR target is driven to a low value during this long period of no activity. The low SIR target causes a high BLER for the signaling sent on TrCh D to set up the data call. The higher BLER results in a high failure rate for the call setup. With the detection techniques described herein, the received blocks for the type 2 transport channel can be reliably detected and used for power control so that good performance can be achieved for both types 1 and 2 transport channels.

For clarity, the detection techniques have been specifically described for transport channels used on the downlink for a voice call in W-CDMA. Thus, W-CDMA terminology such as transport channels, physical channel, SIR target, and BLER target are used in the description above. In general, these techniques may be used for any wireless communication system and for any transmission in which the receiver does not know the format used for transmission. Other systems may use different terminology for channels (e.g., traffic channels or physical channels), SIR target (e.g., target SNR), BLER target (e.g., target frame error rate (FER)), and so on.

The detection techniques described herein may be implemented by various means. For example, these techniques may be implemented in hardware, software, or a combination thereof. For a hardware implementation, the processing units used to perform detection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the detection techniques may be implemented with modules (e.g., procedures, functions, and so on) that perform the functions described herein. The software codes may be stored in a memory unit (e.g., memory unit 1172 in FIG. 11) and executed by a processor (e.g., controller 1170). The memory unit may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing erasure detection in a communication system, comprising:
   ascertaining whether a received block fails an error detection code test;
   if the received block fails the error detection code test, determining whether the received block is an erased block, representing a block transmitted but decoded in error, or a discontinuous transmission (DTX) block, representing a non-transmitted block, by computing and evaluating a plurality of uncorrelated random variables for the received block based on at least two metrics for the received block, the means and standard deviations for the at least two metrics, and a correlation for the at least two metrics, wherein the at least two metrics comprise an energy metric based on energy of symbols in the received block and a symbol error rate (SER); and
   if the received block passes the error detection code test, determining that the received block was successfully decoded.

2. The method of claim 1, wherein the determining whether the received block is an erased block or a DTX block comprises:
- approximating each of the at least two metrics as a Gaussian random variable,
- forming at least one decision criterion based on the approximation of the at least two metrics as Gaussian random variables and the correlation coefficient, and
- performing erasure detection for the received block based on the Gaussian random variables and the at least one decision criterion.

3. The method of claim 1, wherein determining whether the received block is an erased block or a DTX block comprises:
- computing at least two correlated random variables based on the at least two metrics,
- transforming the at least two correlated random variables to at least two uncorrelated random variables based on the correlation coefficient, and
- performing erasure detection for the received block based on the at least two uncorrelated random variables and at least one decision criterion.

4. The method of claim 1, wherein determining whether the received block is an erased block or a DTX block comprises:
- computing the at least two uncorrelated random variables based on correlated random variables transformed using an estimated correlation coefficient, and
- performing erasure detection for the received block based on the at least two random variables and at least one decision criterion.

5. The method of claim 4, further comprising:
- selecting the at least one decision criterion based on at least one other metric for the received block.

6. The method of claim 4, further comprising:
- forming the at least one decision criterion based on a target probability of false alarm.

7. The method of claim 1,
- wherein determining whether the received block is an erased block or a DTX block is further based on a zero state bit.

8. The method of claim 7, further comprising:
- updating the mean and standard deviation of each of the at least two metrics based on received blocks detected to be DTX blocks.

9. The method of claim 7, further comprising:
- updating the mean and standard deviation of each of the at least two metrics based on received blocks detected to be DTX blocks and received blocks detected to be erased blocks.

10. The method of claim 1, further comprising:
- updating the correlation coefficient based on received blocks detected to be DTX blocks.

11. The method of claim 1, further comprising:
- updating the correlation coefficient based on received blocks detected to be DTX blocks and received blocks detected to be erased blocks.

12. A method of performing erasure detection in a wireless communication system, comprising:
- ascertaining whether a received block fails a cyclic redundancy check (CRC) test;
- and if the received block fails the CRC test, obtaining an energy metric for the received block, the energy metric based on energy of symbols in the received block, obtaining a symbol error rate (SER) for the received block, and determining whether the received block is an erased block, representing a block transmitted but decoded in error, or a discontinuous transmission (DTX) block, representing a non-transmitted block, by computing and evaluating a plurality of uncorrelated random variables for the received block based on the energy metric and the SER for the received block, the means and standard deviations for the energy metric and the SER, and a correlation coefficient for the energy metric and the SER;
- if the received block passes the CRC test, determining that the received block was successfully decoded.

13. The method of claim 12, wherein determining whether the received block is an erased block or a DTX block comprises:
- computing first and second uncorrelated random variables based on the energy metric and the SER for the received block and the correlation coefficient,
- evaluating the first and second uncorrelated random variables based on at least one decision criterion, and
- declaring the received block to be an erased block or a DTX block based on result of the evaluation.

14. The method of claim 13,
- wherein the first and second uncorrelated random variables are computed further based on a zero state bit.

15. The method of claim 14, further comprising:
- updating the mean and standard deviation of the energy metric, the mean and standard deviation of the SER, and the correlation coefficient based on received blocks detected to be DTX blocks.

16. The method of claim 13, further comprising:
- selecting the at least one decision criterion based on a zero state bit for the received block.

17. An apparatus in a communication system, comprising:
- a decoder operative to ascertain whether a received block fails an error detection code test; and
- an erasure detector operative to, if the received block fails the error detection code test, determine whether the received block is an erased block, representing a block transmitted but decoded in error, or a discontinuous transmission (DTX) block, representing a non-transmitted block, by computing and evaluating a plurality of uncorrelated random variables for the received block based on at least two metrics for the received block, the means and standard deviations for the at least two metrics, and a correlation coefficient for the at least two metrics, wherein the at least two metrics comprise an energy metric based on energy of symbols in the received block and a symbol error rate (SER); if the received block passes the error detection code test, determine that the received block was successfully decoded.

18. The apparatus of claim 17, wherein the erasure detector is operative to compute at least two uncorrelated random variables based on correlated random variables transformed using an estimated coefficient, to evaluate the at least two uncorrelated random variables based on at least one decision criterion, and to declare the received block to be an erased block or a DTX block based on result of the evaluation.

19. The apparatus of claim 18, wherein the erasure detector is operative to select the at least one decision criterion based on at least one other metric for the received block.

20. The apparatus of claim 17, wherein the erasure detector is operative to derive mean and standard deviation of each of the at least two metrics and to determine whether the received block is an erased block or a DTX block further based on a zero state bit means and standard deviations of the at least two metrics.

21. The apparatus of claim 20, wherein the erasure detector is operative to update the mean and standard deviation of each of the at least two metrics and to update the correlation coefficient based on received blocks detected to be DTX blocks.

22. The apparatus of claim 17, further comprising:
a demodulator operative to process a transport channel carrying control data and to provide the received block.

23. An apparatus in a communication system, comprising:
means for ascertaining whether a received block fails an error detection code test; and
means for, if the received block fails the error detection code test, determining whether the received block is an erased block, representing a block transmitted but decoded in error, or a discontinuous transmission (DTX) block, representing a non-transmitted block, by computing and evaluating a plurality of uncorrelated random variables for the received block based on the means and standard deviations for the at least two metrics, and at least two metrics for the received block and a correlation coefficient for the at least two metrics, wherein the at least two metrics comprise an energy metric based on energy of symbols in the received block and a symbol error rate (SER); if the received block passes the error detection code test, determining that the received block was successfully decoded.

24. The apparatus of claim 23, wherein the means for determining whether the received block is an erased block or a DTX block comprises:
means for computing at least two uncorrelated random variables based on the at least two metrics and the correlation coefficient,
means for evaluating the at least two uncorrelated random variables based on at least one decision criterion, and
means for declaring the received block to be an erased block or a DTX block based on result of the evaluation.

25. The apparatus of claim 24, further comprising:
means for selecting the at least one decision criterion based on at least one other metric for the received block.

26. The apparatus of claim 23,
wherein the means for determining whether the received block is an erased block or a DTX block is further based on a zero state bit.

27. The apparatus of claim 26, further comprising:
means for updating the mean and standard deviation of each of the at least two metrics based on received blocks detected to be DTX blocks, and
means for updating the correlation coefficient based on the received blocks detected to be DTX blocks.

28. A processor readable medium for storing instructions operable in a wireless device, the stored instructions being operable to:
ascertain whether a received block fails an error detection code test; and
if the received block fails the error detection code test, determine whether the received block is an erased block, representing a transport block transmitted but decoded in error, or a discontinuous transmission (DTX) block, representing a non-transmitted block, by computing and evaluating a plurality of uncorrelated random variables for the received block based on at least two metrics for the received block, the means and standard deviations for the at least two metrics, and a correlation coefficient for the at least two metrics, wherein the at least two metrics comprise an energy metric based on energy of symbols in the received block and a symbol error rate (SER);
if the received block passes the error detection code test, determine that the received block was successfully decoded.

29. The processor readable medium of claim 28, and further for storing instructions operable to:
compute at least two uncorrelated random variables based on the at least two metrics and the correlation coefficient,
evaluate the at least two uncorrelated random variables based on at least one decision criterion, and
declare the received block to be an erased block or a DTX block based on result of the evaluation.

* * * * *